(12) United States Patent
Jost et al.

(10) Patent No.: US 7,240,009 B2
(45) Date of Patent: Jul. 3, 2007

(54) DIALOGUE CONTROL APPARATUS FOR COMMUNICATING WITH A PROCESSOR CONTROLLED DEVICE

(75) Inventors: Uwe Helmut Jost, Berkshire (GB); Yuan Shao, Berkshire (GB)

(73) Assignee: Canon Kabushiki Kaisha, Tokyo (JP)

( * ) Notice: Subject to any disclaimer, the term of this patent is extended or adjusted under 35 U.S.C. 154(b) by 881 days.

(21) Appl. No.: 10/398,230

(22) PCT Filed: Sep. 25, 2001

(86) PCT No.: PCT/GB01/04283

§ 371 (c)(1),
(2), (4) Date: Apr. 3, 2003

(87) PCT Pub. No.: WO02/33536

PCT Pub. Date: Apr. 25, 2002

(65) Prior Publication Data

US 2004/0021899 A1 Feb. 5, 2004

(30) Foreign Application Priority Data

Oct. 16, 2000 (GB) .................................. 0025331.0

(51) Int. Cl.
G03G 15/00 (2006.01)
G05B 15/00 (2006.01)
G10L 11/00 (2006.01)
G10L 21/00 (2006.01)

(52) U.S. Cl. ............... 704/275; 700/83; 704/270; 704/274; 704/276; 715/513; 399/87

(58) Field of Classification Search ............... 704/275; 700/83; 399/87
See application file for complete search history.

(56) References Cited

U.S. PATENT DOCUMENTS 5,138,377 A * 8/1992 Smith et al. ............... 399/11
5,490,089 A * 2/1996 Smith et al. ............... 399/81
5,644,737 A * 7/1997 Tuniman et al. ............ 715/810

FOREIGN PATENT DOCUMENTS

EP 0 328 688 8/1989

(Continued)

OTHER PUBLICATIONS

Lucas, Bruce. VoiceXML for Web-Based Distributed Conversational Application, *Communications of the ACM*, Sep. 2000/vol. 43, No. 9, pp. 53-57.*

(Continued)

*Primary Examiner*—David Hudspeth
*Assistant Examiner*—Justin W Rider
(74) *Attorney, Agent, or Firm*—Fitzpatrick, Cella, Harper & Scinto

(57) ABSTRACT

A Control apparatus for controlling communication between a user and at least one processor controlled device, such as a printer or copier, capable of carrying out at least one task. The control includes a processor configured to conduct a dialog with the user to determine the task that the user wishes the device to carry out; instruct the device to carry out the determined task; receive event information related to events; determine whether the user is involved with another task when the event information is received; identify interrupt status information associated with at least one of the event for which event information is received and said other task; determine whether or not the user can be interrupted on the basis of the identified interrupt status information; and advise the user of received event information.

35 Claims, 12 Drawing Sheets

FOREIGN PATENT DOCUMENTS

| | | |
|---|---|---|
| EP | 0 426 909 | 5/1991 |
| EP | 0 854 418 | 7/1998 |
| EP | 0 911 808 | 4/1999 |
| JP | 4-287145 | 10/1992 |
| JP | 9-171449 | 6/1997 |
| KR | 126062 | 12/1997 |

OTHER PUBLICATIONS

Wireless Application Protocol, Wireless Markup Language Specification, Version 1.1, WAP WML, Jun. 16, 1999, available on line at: www.wapforum.org.

Voice eXtensible Mark-up Language, VoiceXML, Version 1.0, by VoiceXML Forum Technical Working Group: found at http://www.w3.org/TR/2000/NOTE-VOICEXML-20000505/ as available on Oct. 12, 2000.

G.D. Abowd, et al., "A Formal Technique For Automated Dialogue Development", DIS '95. Symposium On Designing Interactive System: Processes, Practices, Methods, and Techniques. Ann Arbor, Aug. 23-25, 1995, New York, ACM, US, pp. 219-226, Aug. 23, 1995.

T. Selker, "Coach: A Teaching Agent That Learns", Communications Of The Association For Computing Machinery, Association For Computing Machinery, New York, US, vol. 37, No. 7, pp. 92-99, Jul. 1, 1994.

* cited by examiner

DIALOGUE CONTROL APPARATUS FOR COMMUNICATING WITH A PROCESSOR CONTROLLED DEVICE

This application is a National Stage Filing Under 35 U.S.C. 371 of International Application No. PCT/GB01/04283, filed Sep. 25, 2001, and published in English as International Publication No. WO 02/33536 A2, on Apr. 25, 2002.

This invention relates to a control apparatus, in particular, to a control apparatus that enables communication with a user to allow a user to control the carrying out of a number of different processes or tasks.

There is increasing interest in systems that enable a user to control the carrying out of a task or process by conducting a spoken dialog with control apparatus. Examples of such systems are telephone or on-line booking systems for booking, for example, airline tickets and office or home equipment systems such as described in EP-A-0911808 and EP-A-0854418 for enabling a user to control operation of an item of office or home equipment such as a printer or VCR by voice commands.

In such systems there is a need to be able to advise the user that an event has occurred that affects the carrying out of a task or process instructed by the user, for example in the case of a printing task, that a paper jam has occurred that prevents the printer carrying out the printing task. Informing the user that such an event has occurred may however be disruptive especially if the user is in the process of instructing the carrying out of a further task.

In one aspect, the present invention provides control apparatus arranged to control whether or not a user is interrupted with information concerning a task instructed by the user.

In one aspect, the present invention provides a control apparatus that enables a user to control the carrying out of processes or tasks by conducting a dialog with the control apparatus wherein the control apparatus is configured to decide whether or not a current dialog with the user for controlling a current process or task can be interrupted with information for the user concerning another process or task in dependence upon the particular current process or task.

In an embodiment, the control apparatus may be configured to control items of equipment such as items of office or home equipment and may be configured to control whether or not a user is advised of a message from an item of equipment indicating that the item of equipment cannot carry out a previously instructed task in dependence upon the current task being instructed by the user. For example, the control apparatus may be configured to determine whether or not a user's current activities can be interrupted by a message from a printer concerning a previously instructed print job advising the user that the particular printer is off-line, out of paper or a paper jam has occurred, for example.

A control apparatus embodying the invention enables flexibility in the timing of handling of events such as error messages so that a user is only interrupted in the instructing or carrying out of a current task under certain conditions. This enables the use of the control apparatus to be more user friendly and should enable disruption of the user's activities to be kept to a minimum.

The present invention is particularly advantageous for use where dialog between a user and the control apparatus to control the carrying out of a task or process is a spoken dialog because a spoken dialog is necessarily a timed sequential event and it is not generally possible to conduct two spoken dialogs at once. The present invention may also be advantageous where the dialog between the user and the control apparatus is partly spoken and partly visual, for example, where the user issues instructions orally and the control apparatus displays visual messages to a user and where a user may mix oral and manual (for example keyboard or mouse click) commands in the dialog with the user. The present invention may also be useful where the dialog between the control apparatus and the user is non-oral, that is where the user inputs commands using a manually operable user interface such as a mouse or keyboard and messages are displayed to the user on a display screen, especially where the display screen has limited real estate and where uncontrolled display of error messages to a user would unduly clutter the display screen.

The control apparatus may be arranged to be configured by an application developer using a markup language. This is particularly advantageous because markup languages are particularly designed to facilitate presentation of information to a user. Even though the markup may be procedural, it is always intermixed with the data to be presented to the user and it is not necessary for the applications developer to consider how records are to be stored, read or how individual fields are to be addressed. Rather all of the data is presented to the applications developer and the applications developer incorporates the markup language into the data where it is required. This makes markup languages very easy to learn and apply. Also markup documents are easy to understand and modify and have a very low risk of errors.

In one aspect, the present invention provides a markup language with the added functionality of enabling whether or not a task being carried out by a user is interrupted by information concerning an event to be controlled or determined by the particular event and the particular task being carried out.

In an embodiment, the present invention provides an extension to a markup language capable of enabling a spoken dialog with a user with such added functionality. The markup language may be VoiceXML which is based on the World Wide Web Consortiums industry standard extensible markup language (XML) and which provides a high level programming interface to speech and telephony resources. VoiceXML is promoted by the VoiceXML Forum founded by AT&T, IBM, Lucent Technologies and Motorola and by the VoiceXML working group part of W3C. The specification for Version 1.0 of VoiceXML can be found at http://www.voicexml.org and at http://www.w3.org/TR/2000/NOTE-voicexml-20000505.

An embodiment of the present invention provides a control apparatus configured for conducting a dialog, for example an oral dialog, with a user to enable the user to control a process or operation, wherein the control apparatus is configured to provide the user with details of an event associated with a process or task instructed by the user. For example, where the control apparatus is configured to enable a user to control operation of one or more items of office equipment, the control apparatus may be configured to provide the user not only with details of the event that has occurred such as, for example, a paper jam, an out of paper or off-line event in the case of the printer but also with details of the specific printer and the print job at which the event occurred so that the user can determine exactly what initiated the event.

Embodiments of the present invention will now be described, by way of example, with reference to the accompanying drawings, in which.

Figure 1:
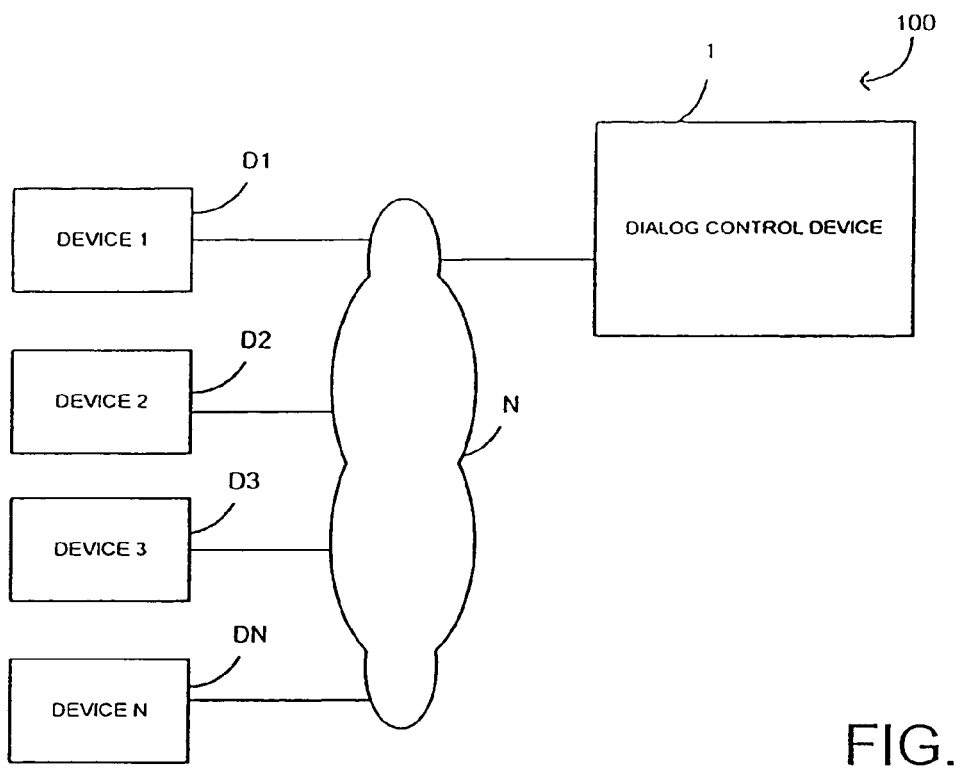
FIG. 1 shows a schematic block diagram of a system embodying the present invention.

Referring now to the drawings, FIG. 1 shows by way of a block diagram a system 100 comprising a dialog control device 1 coupled by a network N to a number of processor controlled machines or devices D1 to DN.

In this embodiment, the devices D1 to DN are in the form of items of electrical equipment found in the office and/or home environment and capable of being adapted for communication and/or control over a network N. Examples of items of office equipment are, for example, photocopiers, printers, facsimile machines, digital cameras and multifunctional machines capable of copying, printing and facsimile functions while examples of items of home equipment are video cassette recorders, televisions, microwave ovens, digital cameras, lighting and heating systems and so on.

The devices D1 to DN may all be located in the same building or may be located in different buildings. The network N may be a local area network (LAN), wide area network (WAN), an Intranet or the Internet. It will, of course, be understood that as used herein the word "network" does not necessarily imply the use of any known or standard networking system or procotol and that the network N may be any arrangement that enables communication with items of equipment or machines located in different parts of the same building or in different buildings.

Figure 2:
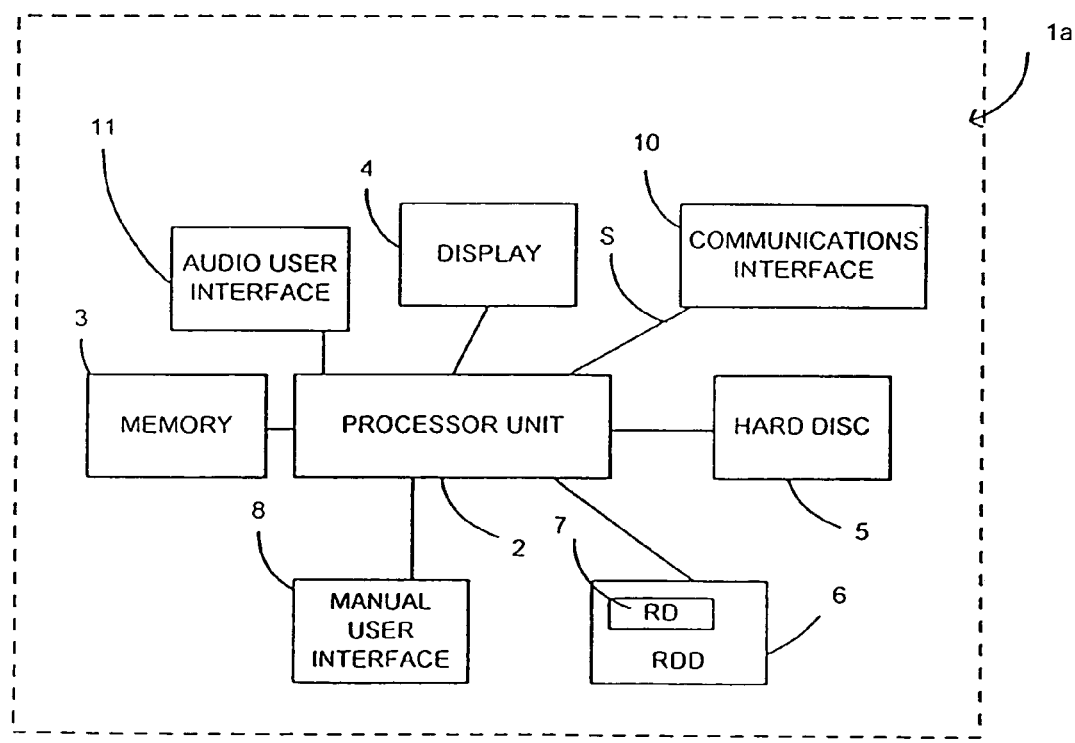
FIG. 2 shows a block diagram of a computer system suitable for forming a dialog control device of the system shown in FIG. 1.

FIG. 2 shows a block diagram of a computer system 1a that may be used to provide the dialog control device 1. The computer system may be, for example, a personal computer or work station and comprises, as shown, a central processor unit (CPU) 2 with associated memory (ROM and/or RAM) 3, hard disk drive 5, removable disk drive (RDD) 6 for receiving a removable storage medium or disk (RD) 7, a display 4 for displaying information to a user, a manual user interface 8 such as a keyboard and/or pointing device such as a mouse, a communications interface 10 for enabling communication with the devices D1 to DN over the network N and an audio user interface 11 for receiving speech from a user and transmitting audio sounds to the user.

Figure 3:
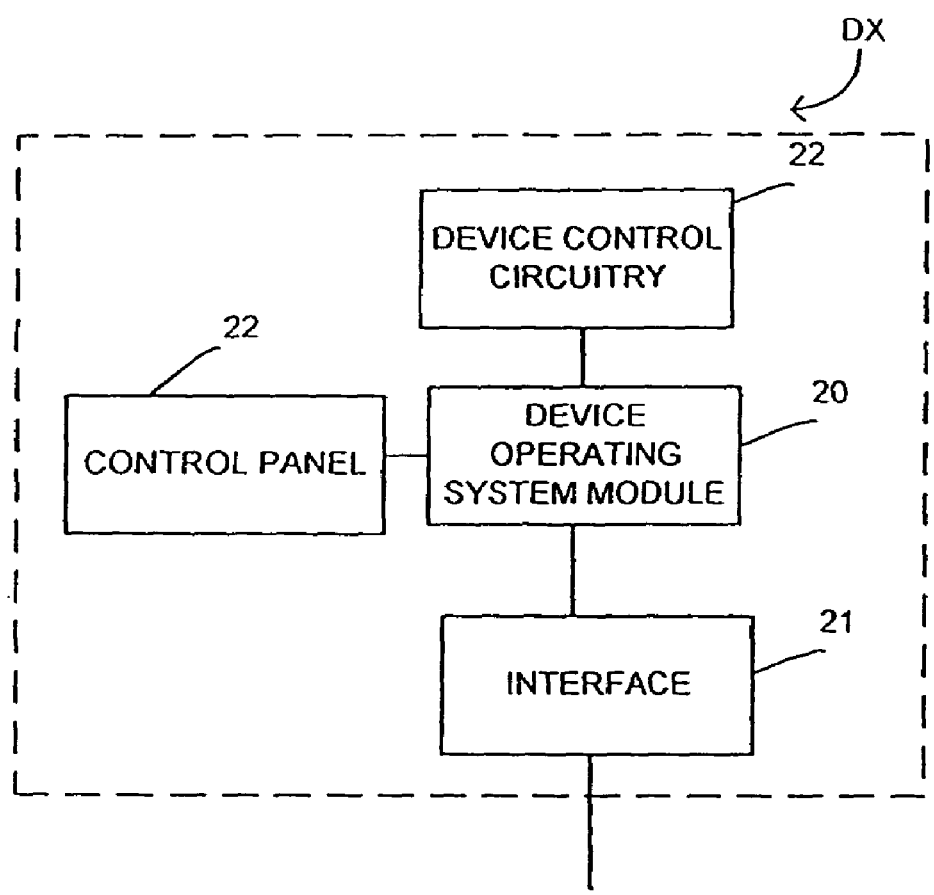
FIG. 3 shows a block diagram illustrating functional components of a device of the system shown in FIG. 1.

FIG. 3 shows a block schematic diagram of a device D1 to DN. The processor controlled device comprises a device operating system module 20 that generally includes CPU and memory such as ROM and/or RAM. The operating system module 20 communicates with the dialog control device 1 via an interface 21 to enable the device to receive the device implementable instructions from the dialog control device 1 in accordance with instructions received from a user and to transmit to the dialog control device information regarding events occurring at the device. The device operating system module 20 is also coupled to device control circuitry 22 that, under the control of the operating system module 20, causes the functions required by the user to be carried out. The device control circuitry 22 will correspond to that of a conventional device of the same type capable of carrying out the same function or functions (for example printing functions in the case of a printer or photocopier functions in the case of a photocopier) and so will not be described in greater detail herein.

As shown, the device operating system module 20 also communicates with a control panel 22 that may include a display for displaying messages and/or information to a user and control buttons for enabling manual input of instructions by the user.

Generally, the program instructions and/or data for controlling operation of the device operating system module 20 would be prestored in its memory. Processor instructions and/or data may also be supplied to the device operating system module as a signal via the interface 21.

The computer system 1a shown in FIG. 2 is configured by program instructions and/or data to provide the dialog control device 1. The program instructions for configuring the computer system 1a and data are supplied to the processor unit 2 in at least one or two ways:

1. as a signal S supplied over the network N; and
2. carried by a removable data storage medium RD.

Program instructions and data will be stored on the hard disk drive 5 and/or in the memory 3 in known manner.

Figure 4:
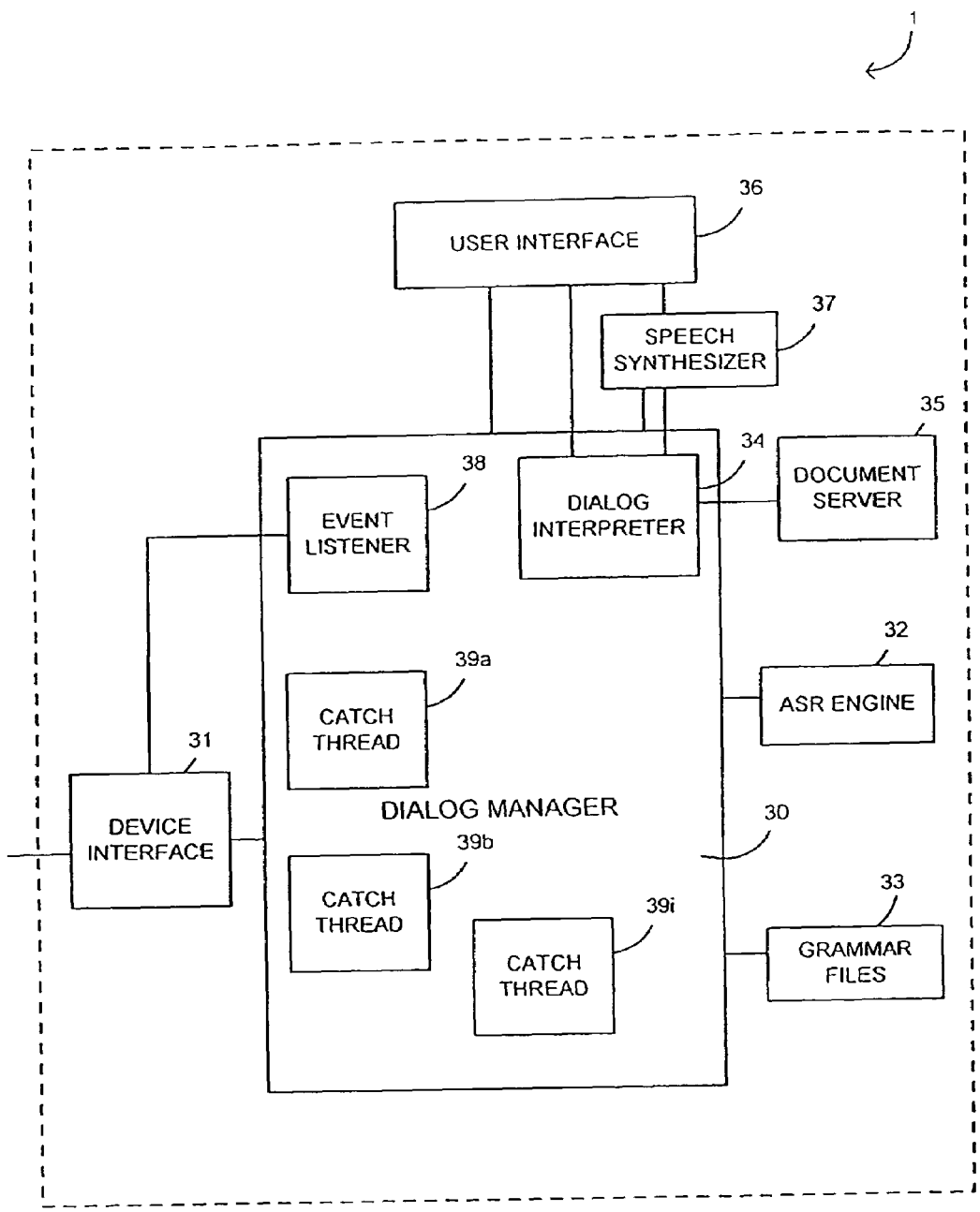
FIG. 4 shows a functional block diagram of the dialog control device shown in FIG. 1.

FIG. 4 shows a block diagram illustrating the functional components provided by the computer system 1a when programmed to provide the dialog control device 1.

As shown, the dialog control device comprises a dialog manager 30 which provides overall control functions and coordinates the operation of the other functional components of the dialog control device. The dialog manager 30 communicates with the device operating system module 20 of the devices D1 to DN via their respective interfaces 21 and a device interface 31 which includes, for each device D1 to DN, a device object that enables instructions to be sent to the corresponding device and details of events to be received from that device. The device object may be pre-stored in the dialog control device 1 or may, more likely, be downloaded from the device operating system module 20 of the device D1 to DN when the device D1 to DN is coupled to the dialog control device 1 via the network N.

The dialog manager 30 communicates with an automatic speech recognition engine 32 and a grammar file store 33 storing grammar files for use by the automatic speech recognition engine 32. Any known form of automatic speech recognition engine 32 may be used. Examples are the speech recognition engines produced by Nuance, Lernout and Hauspie, by IBM under the trade name "Via Voice" and by Dragon Systems Inc under the trade name "Dragon Naturally Speaking". As will be understood by those skilled in the art, communication with the automatic speech recognition engine 32 is via a standard speech applications program interface (SAPI) such as the Microsoft SAPI. Generally, the grammar stored in the grammar file store 33 will be in the SAPI grammar format.

The dialog manager 30 includes a dialog interpreter 34 which communicates with a document server 35 providing documents or dialog files and interprets and executes the dialog files to enable a dialog to be conducted with the user. The dialog manager 30 and dialog interpreter 34 are coupled to a user interface 36 both directly and via a text-to-speech synthesiser 37 to enable oral communication with a user via the user interface. The user interface 36 may constitute a web type browser interface adapted for voice communication.

As will be explained below, when a device D1 to DN is instructed by the dialog control device 1 to carry out a function task or process specified by a user, the dialog manager 30 may register an event listener 38 which is associated with the corresponding device object and listens for events received from that device D1 to DN such as, for example, error messages indicating that the device cannot perform the requested task or function for some reason. As will be explained below, the dialog manager 30 creates a catchthread object for each event. Thus if there are i events then i catchthread objects are created. For simplicity, FIG. 4 shows only three catchthread objects 39a, 39b and 39.

In this embodiment, the dialog files or documents are written in VoiceXML which is based on the World Wide Web Consortiums Industry standard extensible markup language (XML) and which provides a high level programming interface to speech and telephony resources. VoiceXML is promoted by the VoiceXML forum and by the VoiceXML working group part of W3C. The specification for Version 1.0 of VoiceXML can be found at http://www.voicexml.org and at http://www.w3.org/TR/2000/NOTE-voicexml-20000505.

In the terminology of the VoiceXML specification, the user interface 36 constitutes the platform implementation, the dialog manager 30 constitutes the VoiceXML Interpreter Context, the dialog interpreter 34 constitutes the VoiceXML interpreter and the document server 35 constitutes, of course, the document server.

The document server 35 processes requests from the VoiceXML interpreter through the VoiceXML Interpreter Context and, in reply, provides VoiceXML documents (dialog files) which are processed by the VoiceXML interpreter. The VoiceXML Interpreter Context may monitor user inputs from the user interface 36 in parallel with the VoiceXML Interpreter 34. For example, one VoiceXML Interpreter Context may always listen for a specialist escape phrase that takes the user to a high level personal assistant and another may listen for escape phrases that alter user preferences like volume or text-to-speech characteristics.

The user interface 36 or implementation platform communicates with the VoiceXML interpreter context and the VoiceXML Interpreter. Thus, for example, the VoiceXML Interpreter Context or dialog manager 30 will be responsible for detecting incoming speech from the user, acquiring the initial VoiceXML document and acknowledging the user's input while the VoiceXML interpreter or dialog interpreter 34 will conduct the dialog after acknowledgement.

The VoiceXML documents provided by the document server 35 are primarily composed of top level elements called dialogs. There are two types of dialogs in VoiceXML, forms and menus.

The VoiceXML Interpreter 34 is arranged to begin execution of a document at the first dialog by default. As each dialog executes, it determines the next dialog.

VoiceXML documents consist of forms which contain sets of form items. Form items are divided into field items which define the form's field item variables and control items that help control the gathering of the form's fields. The VoiceXML Interpreter interprets the forms using a form interpretation algorithm (FIA) which has a main loop that selects and visits a form items as described in greater detail in the VoiceXML specification.

Figure 5:
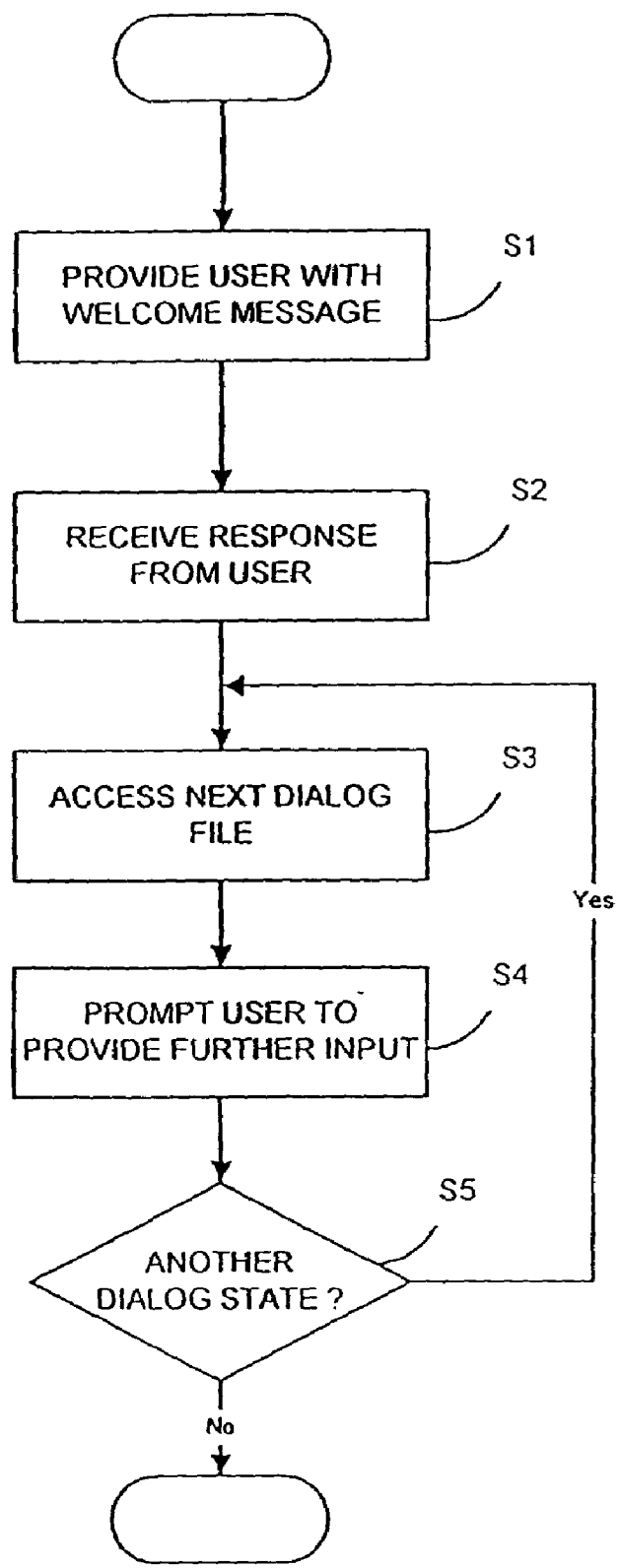
FIG. 5 shows a flow chart for illustrating steps carried out by the dialog control device during a dialog with a user.

FIG. 5 shows a flow chart for illustrating, at a top level, the steps carried out by the dialog control device in a dialog with a user. Once, as set out above, the dialog manager 30 has acknowledged a user input indicating that the user wishes to input spoken commands for controlling a function of a device D1 to DN coupled to the network N, then the dialog manager 30 will use the field interpretation algorithm to access the first field item of a first document or dialog file to provide the user, via the text to speech synthesiser 37, with a welcome message (step S1 in FIG. 5) prompting the user to input a voice command. For example, the welcome message may be "Welcome to the xxxx system. What do you want to do, print, fax, copy?".

The dialog manager 32 then waits for a response from the user. When speech data is received via the user interface 36 at step S2, the dialog manager 30 accesses the ASR engine 32 and the grammar files associated with the field item and causes the ASR engine 32 to perform speech recognition processing on the received speech file. The dialog manager 30 then receives the results of the speech recognition processing and, in accordance with the result, determines what it is that the user wishes to do.

If the user utters the word "print" in response to the prompt, then the dialog manager 30 causes the dialog interpreter 34 to access the dialog file or documents associated with the word "print" at step S3 and, in response to receipt of that further dialog file, the dialog interpreter 34 will provide to the user a prompt requesting the user to provide further information, for example the prompt may request the user to identify the printer required (step S4). Steps S3 and S4 are repeated until at step S5 a dialog file does not specify a successor which will indicate that the dialog manager 30 has retrieved the necessary information to provide, via the device interface 31, the device interpretable instructions to cause the task or process requested by the user to be carried out. If, for example, the user wishes to print a particular document, then the dialog files may be such that execution of the dialog is terminated once the user has, in response to prompts provided by the dialog interpreter 34, identified the required printer, the required document and number of copies. Once the necessary information has been acquired then the dialog manager will forward, via the device interface 31, device interpretable instructions to the identified device to cause the required task to be carried out. This may be achieved by representing the device task as an ECMA object in the scripting environment of an ECMAscript interpreter to enable the device to be controlled by the use of VoiceXML script elements. ECMA stands for European Computer Manufacturers Association and ECMAscript is a non-proprietary standardised version of NetScape's JavaScript and Microsoft's JScript.

In this example, when the dialog manager 30 instructs a device to carry out a task or process via the device interface 31, it registers an event listener 38 for that device to enable detection of events at the device that may affect the carrying out of the requested job or process, for example, in the case of a printer, to detect events such as paper jam, out of paper or printer off-line. Whether or not an event listener is registered will depend upon the particular task and device concerned.

Figure 6:
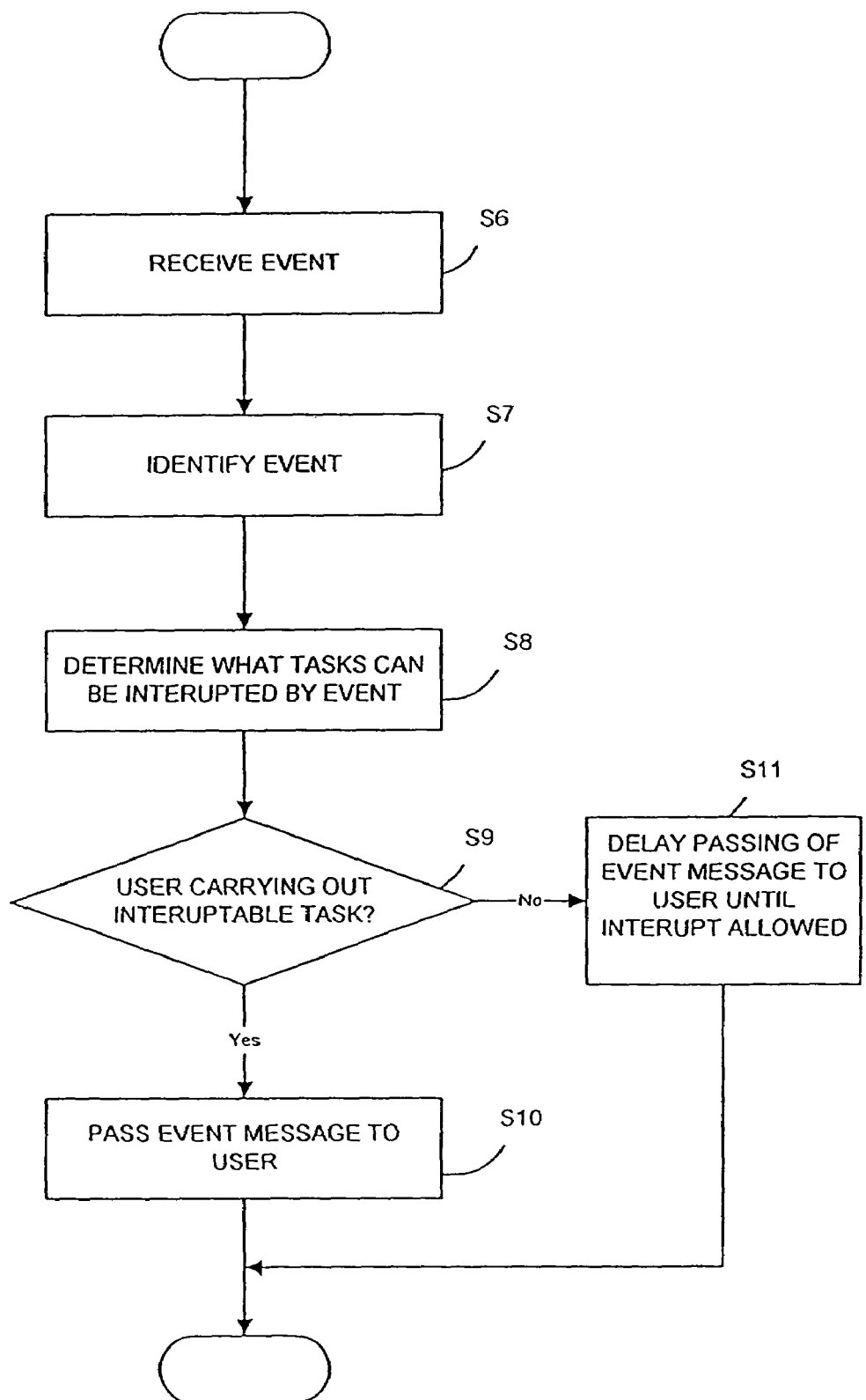
FIG. 6 shows a flow chart for illustrating steps carried out by the dialog control device in response to receipt of an event from one of the devices shown in FIG. 1.

FIG. 6 shows a flow chart for illustrating the steps carried out by the dialog control device 1 to handle an event received from a device D1 to DN.

Thus, at step S6 in FIG. 6, the event is detected by the event listener 38 which then alerts the dialog manager 30 to the receipt of the event. At step S7, the dialog manager 30 identifies the event and then at step S8 determines what tasks that are currently being carried out by the user may be interrupted by the event.

If the dialog manager 30 determines that the user is carrying out an interruptable task at step S9, then, at step S10, the dialog manager 30 may cause the speech synthesiser 37 to pass an event-message to the user at step S10 advising him or her of the event that has occurred. Thus, for example, where the user was running a print job and the printer has reported that a paper jam has occurred, then the dialog manager 30 will cause the user's current task to be interrupted by a message stating that a paper jam has occurred on the printer. Alternatively or additionally, the dialog manager 30 may commence a sub-dialog when the task is interruptable.

If, however, at step S9, the dialog manager 30 determines that the user is carrying out a task that cannot be interrupted, then at step S11, the dialog manager 30 delays passing of the event message to the user until it determines that the user can be interrupted, for example, when the user has completed his current task. This means that the user is not automatically interrupted by event or error messages as and when they are received but only under certain conditions.

The specification for VoiceXML includes catch elements that enable events to be handled by associating a catch with a document, dialog or form item. However, in order to enable the dialog manager 30 to determine whether or not a user can be interrupted, additional functional components have been added to the current VoiceXML specification. These components enable tasks or field items to be defined as interruptable or non-interruptable. In the present embodiment, this is achieved by adding the elements "lock" and "interrupt" to the current VoiceXML elements.

In the present embodiment, the definition of tasks as being locked or interruptable is included in the catch statement for the corresponding events.

The following illustrates part of a VoiceXML document to show the inclusion of such additional elements. It will be appreciated that this VoiceXML document is not complete (as shown by the ellipsis) and that there may be more than one catch event.

```
<vxml version="1.0">
<catch event="error.com.xyz. printer.paperjammed">
<prompt>
printer paper jam </prompt>
lock="tasks.fax"
interrupt="tasks.email,tasks . . .
</catch>
<form ID="tasks">
<field>
<prompt> What do you want to do print, fax, email . . . ?
</prompt>
.
.
.
<filled>
.
.
.
</filled>
.
.
.
</field>
.
.
>field name="print">
.
.
.
</field>
.
.
<field name="fax">
.
.
</field>
.
.
.
<field name="email">
.
.
</field>
.
.
.
</form>
```

The above extract from a sample VoiceXML document incorporates a single catch element for catching an event indicating an error message from printer "xyz" indicating a paper jam. As shown, this catch element incorporates a lock element specifying that a task named "fax" cannot be interrupted by that event but that a task named "email" (and possibly other tasks as indicated by ellipsis) may be interrupted by that event. The catch event is followed by a form with the ID "task" which includes a number of field items for the different tasks such as print, fax, email. Again, the ellipsis indicate that the field items are not complete but will normally include, as will be understood by the person skilled in the art, prompt and filled elements, for example.

In the case of the VoiceXML document presented above, when the event listener 38 detects an event in the form of an error message from the printer xyz indicating that there has been a paper jam, the dialog manager 30 determines whether a user task is currently in progress and, if so, determines from the catch element whether that particular task can be interrupted or not. In the present case, if the dialog manager 30 determines that the task "fax" is currently being processed then the dialog manager will not interrupt the task with the event message. However, if the dialog manager determines that the task "email" is currently in progress then the dialog manager will determine that the task can be interrupted and will cause the speech synthesiser 37 to issue a message to the user informing them that the printer paper has jammed.

An implementation of the form interpretation algorithm incorporating the interruption control described above using JAVA will now be described with reference to the flow charts shown in FIGS. 7 to 13.

Figure 7:
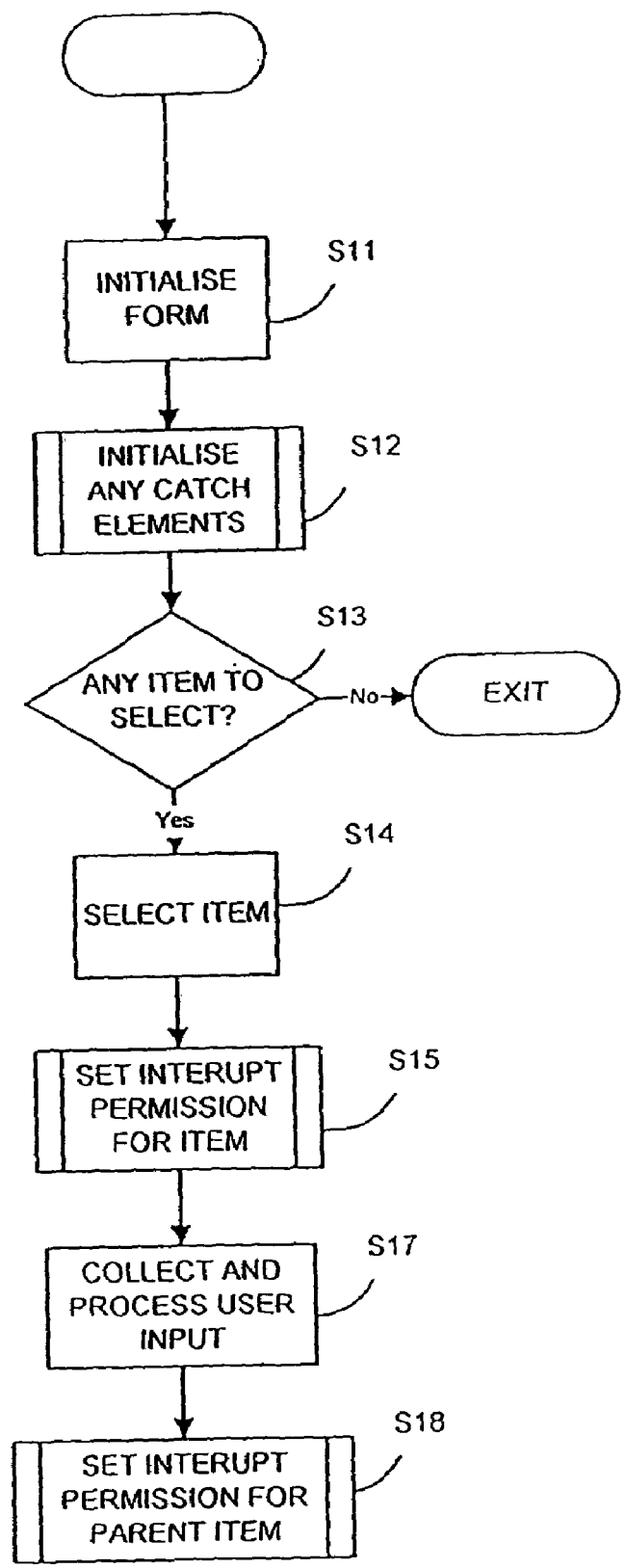
FIG. 7 shows a flow chart for illustrating in greater detail steps carried out by the dialog control device during part of a dialog with a user.

FIG. 7 shows a flow chart illustrating at a top level implementation of the form interpretation algorithm. Thus, at step S11, upon entry to a form, the form is initialised with internal prompt counter variables being reset to one and each variable being initialised, in document order as set out in the VoiceXML version 1.0 specification. Then, the dialog manager 30 initialises any catch elements at step S12. Then at step S13, the dialog manager checks to see whether there are any form items to be selected for visiting by the form interpretation algorithm. Generally, the form items will be visited once only and in the order they are presented within the document. At step S14, the dialog manager 30 selects the next form item to be visited and, as an addition to the Voice XML version 1.0 specification, at step S15 sets the interrupt permissions for the form item as will be described in detail below. Then, at step S17, the collect phase of the standard form interpretation algorithm is entered when the next unfilled form item is visited which prompts the user for input, enables the appropriate grammars and then waits for and collects an input such as a spoken phrase from the user or an event such as a request for help or a no input timeout. The input is processed by filling form items and executing the filled elements in accordance with the VoiceXML Version 1.0 specification. Then, at step S18, the dialog manager sets the interrupt permissions for the parent item if the form item is a child item and returns to step S13. Step S13 to S18 are repeated until the answer at step S13 is no, that is all form items have been selected.

Figure 8:
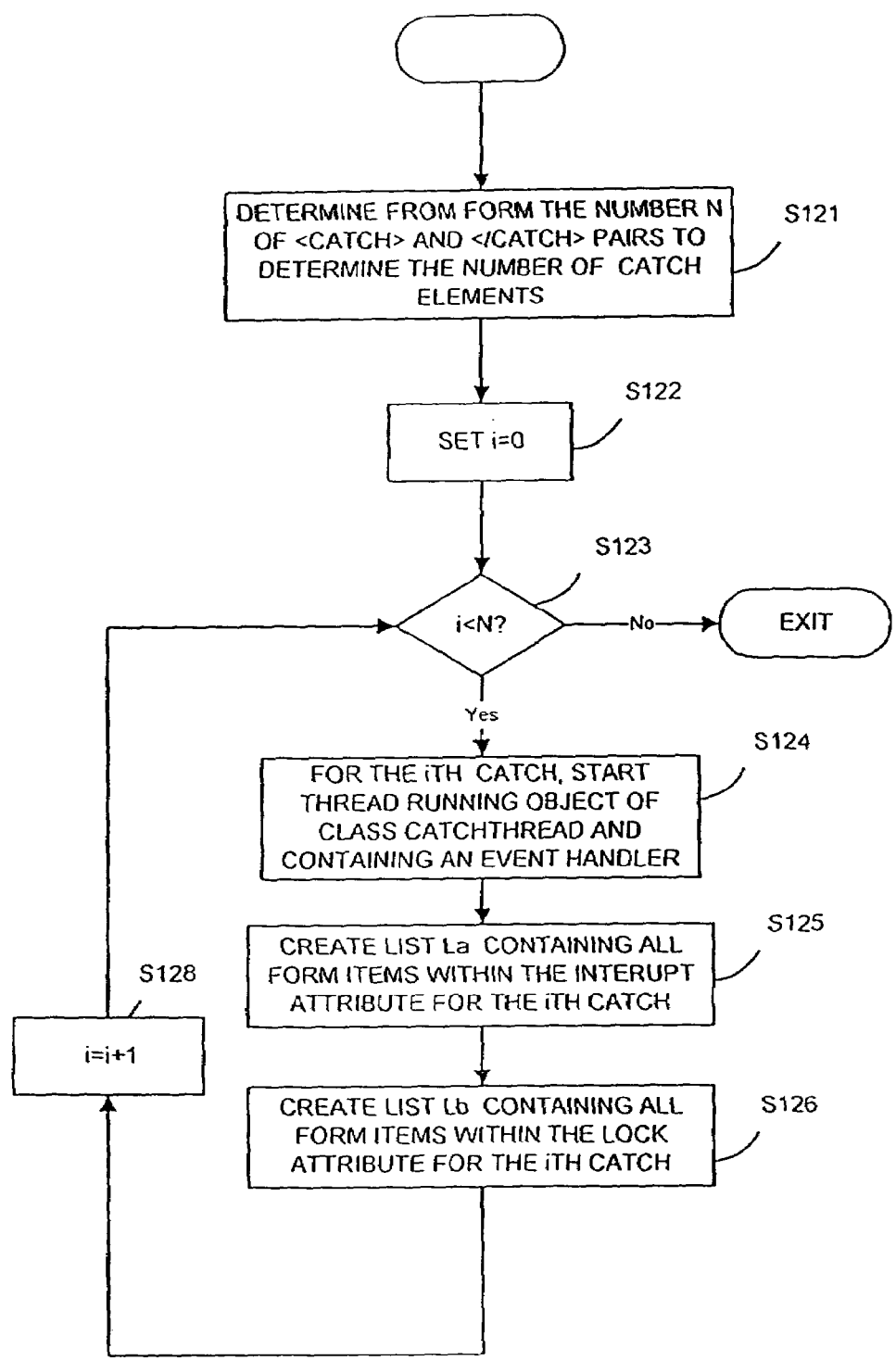
FIG. 8 shows a flow chart for illustrating steps carried out by the dialog control device to determine which form items are interruptable and which are not interruptable.

FIG. 8 shows a flow chart for illustrating in greater detail step S12 in FIG. 7. Thus, at step S121, the dialog manager 30 determines from the form the number of <catch> and </catch> pairs to determine the number of catch elements or "catches" and at step S122 sets a variable i=O. At step S123, the dialog manager 30 determines whether the variable i=N and if so exits the procedure. If, however, the answer is no, that is i is less than N, then at step S124, the dialog manager starts for the ith catch a thread running an object of class catchthread and containing an event handler for the ith catch. Then, at step S125, a list La containing all the form items within the interrupt attribute for the ith catch is created and at step S126 a list of Lb containing all the form items within the lock attribute for the ith catch is created. i is incremented by 1 at step S128 and steps 123 to 128 repeated until the answer at step S123 is no. At this stage a thread running an object of class catchthread and providing an event handler for the catch has been initiated for each catch, a list La containing all the form items within the interrupt attribute has been created for each catch, a list Lb containing all form items within the lock attribute has been created for each catch.

Figure 9:
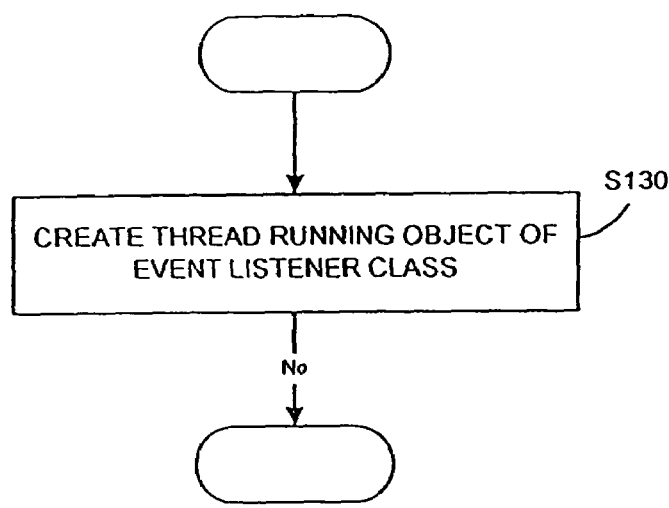
FIG. 9 shows a flow chart illustrating creation of an event listener.

An object of class event listener is created in a different thread as shown by step S130 in FIG. 9.

Figure 10:
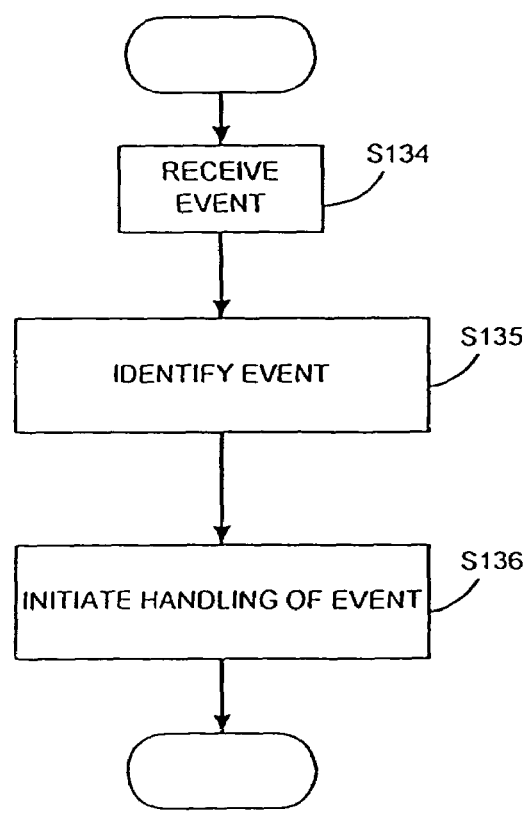
FIG. 10 shows a flow chart for illustrating steps carried out by the dialog control device upon receipt of an event.

As will be appreciated, the class event listener is running in another thread in parallel with the others and its sole purpose to receive notifications of all events and to inform the main thread. This is illustrated by FIG. 10. Thus, at step S134 the thread receives a corresponding event and notifies the main thread causing the dialog manager at step S135 to identify the event and then at step S136 to initiate handling of the event.

Figure 11:
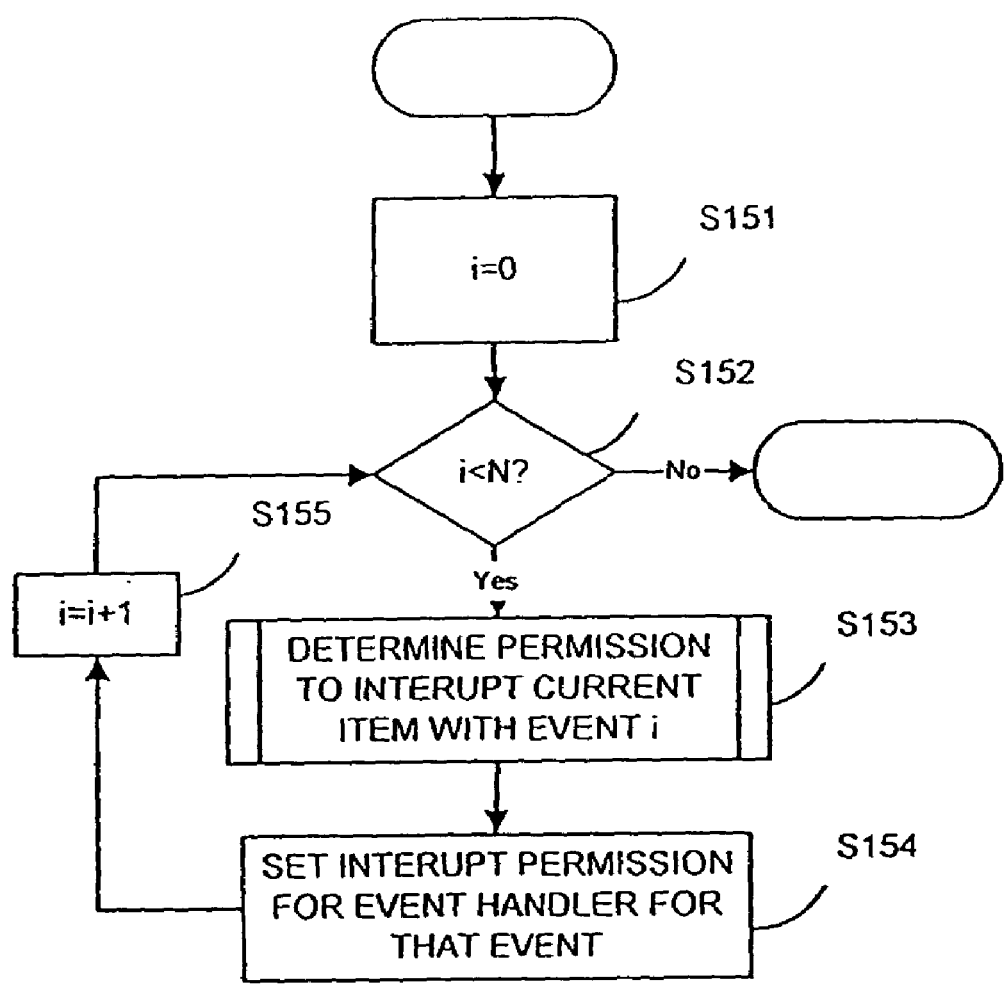
FIG. 11 shows a flow chart for illustrating setting of interrupt permissions for a form item.

FIG. 11 shows in greater detail the step S16 in FIG. 8 of setting interrupt permissions for a form item. Thus, at step S151, a variable i is set equal to 0, at step S152 a check is made to see whether i is less than N and if the answer is no the procedure is exited. Then, at step S153, whether or not interruption of the current item with an event of event type (i) is permitted is checked and at step S154, the interrupt permission for the ith event handler is set, the variable i is then incremented at step S155 and steps S152 to 155 repeated until the answer at step S152 is no when the interrupt permissions will have been set for the current form item for each catch, that is for each event to be caught.

Figure 12:
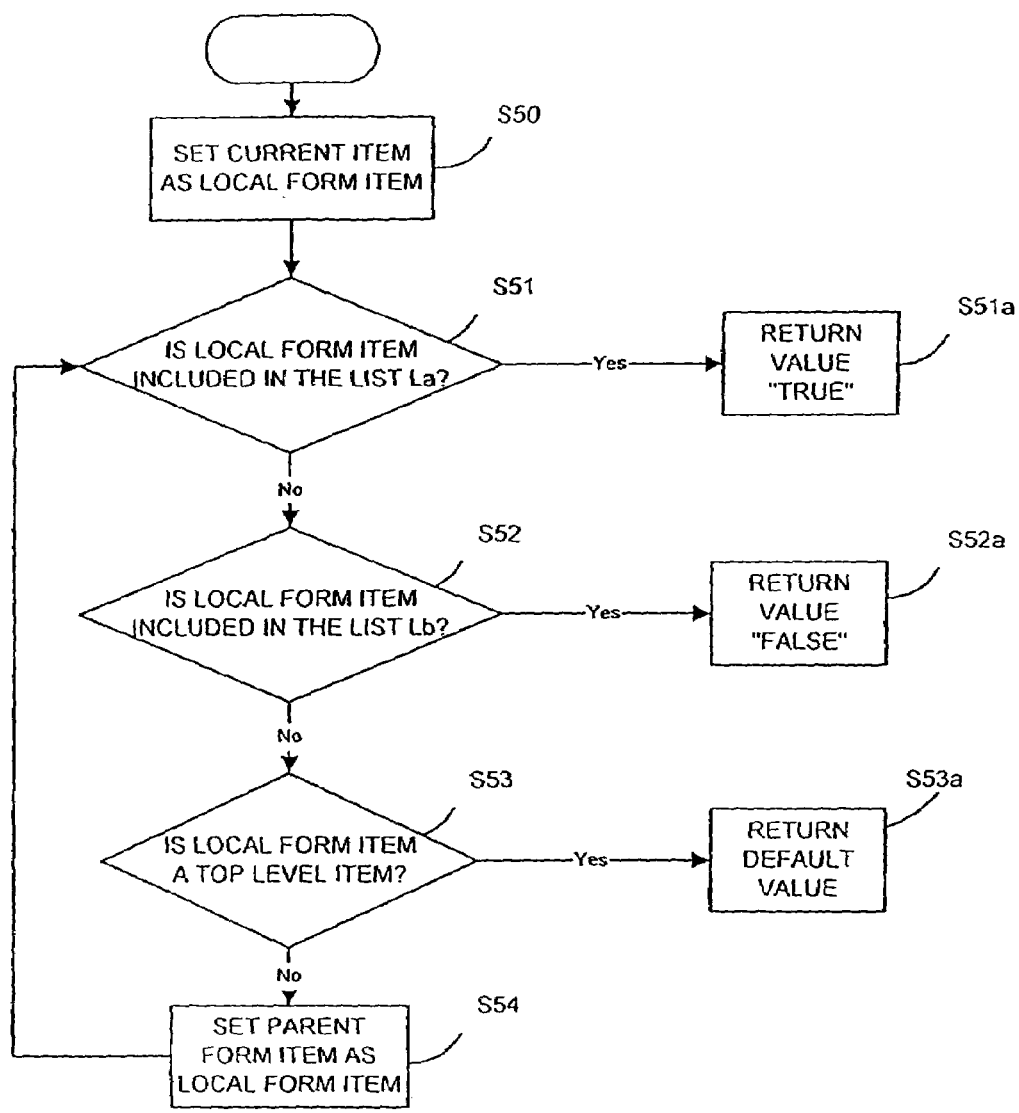
FIG. 12 shows a flow chart for illustrating steps carried out by the dialog control device to determine whether a form item can be interrupted by an event.

FIG. 12 shows in greater detail the step S153 of FIG. 11. Thus, at step S50, the current item is set as "local form item" and at step S51, a check is made to see if the current item is included in the list La. If the answer is yes, then a value "true" is returned. If, however, the answer is no, then a check is made at step S52 whether the current item is included in the list Lb. If the answer is yes, then a value "false" is returned at step S52a. If the answer at step S52 is no, then a check is made as to whether the local form item is a top level item at step S53 and, if so, a default value is returned at step S53a. In the present example, the default is to allow interruption and accordingly the value false will be returned. If the answer at step S53 is no, then the current parent form item is set as the local form item and the steps S51 to S53 repeated. The procedure shown in FIG. 12 enables each form item starting at the lowest level to be checked to determine whether it can be interrupted or not. The status of a child item will override that of the parent item so that even though the parent item is interruptable, the child items within the parent item may not be interruptable.

Figure 13:
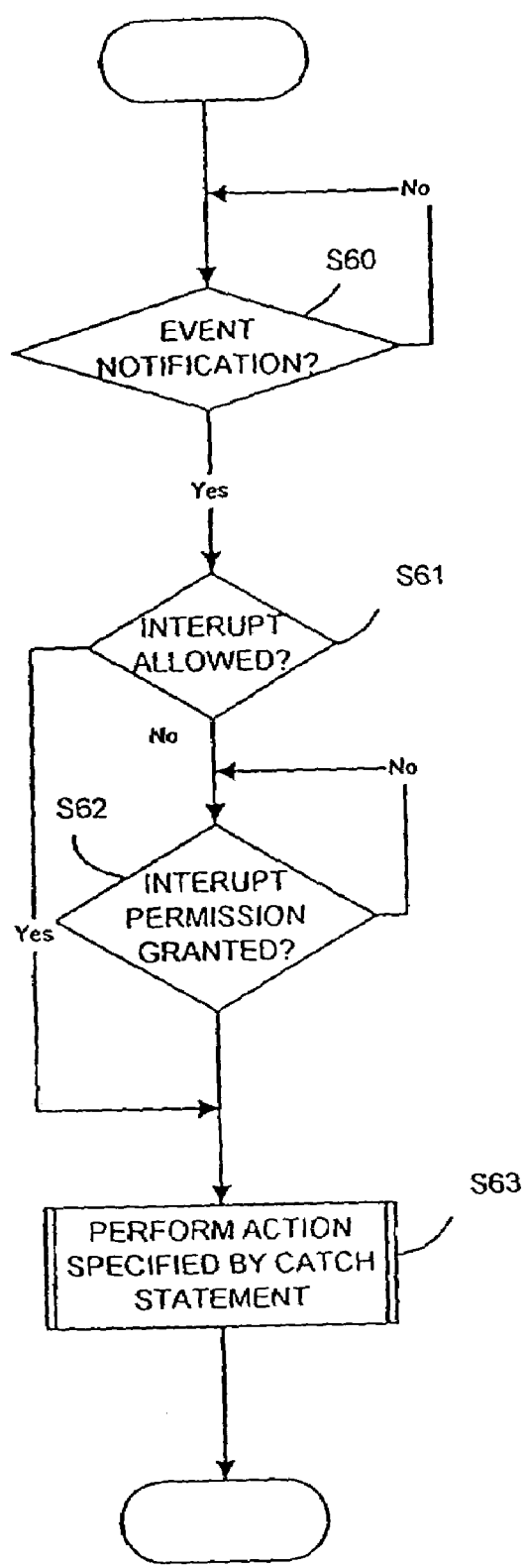
FIG. 13 shows a flow chart for illustrating handling of an event.

FIG. 13 shows the process of event handling by the event handler of the catchthread object for the ith catch. Thus, when at step S60 the event handler thread receives notification of an event, then at step S61 a check is made to see whether interruption is allowed by checking the interrupt permission set at step S154 in FIG. 11. If the interrupt permission set for the event handler indicates that permission is not granted, then the event handler waits at step S62 for permission to be granted. This may be granted when, for example, the user's current task is completed and no other events are being handled. When the event handler determines that the interrupt permission set for the event allows interruption at step S61, then the event handler causes at step S63 the actions specified by the catch statement to be performed and the user is supplied with a message via the speech synthesiser 37 relating to the event, for example, the message, "printer paper jam" in the case of a printer paper jam event.

In the method described above, an event message supplied to a user simply indicates that an event has occurred (that is for example a paper jam) and does not provide the user with details of the exact event.

Where the event is provided as an event object which may be the case, where for example, the device operating system module 20 of a device is configured as a JAVA virtual machine, then it is possible to provide the user with further information regarding the actual event.

Figure 14:
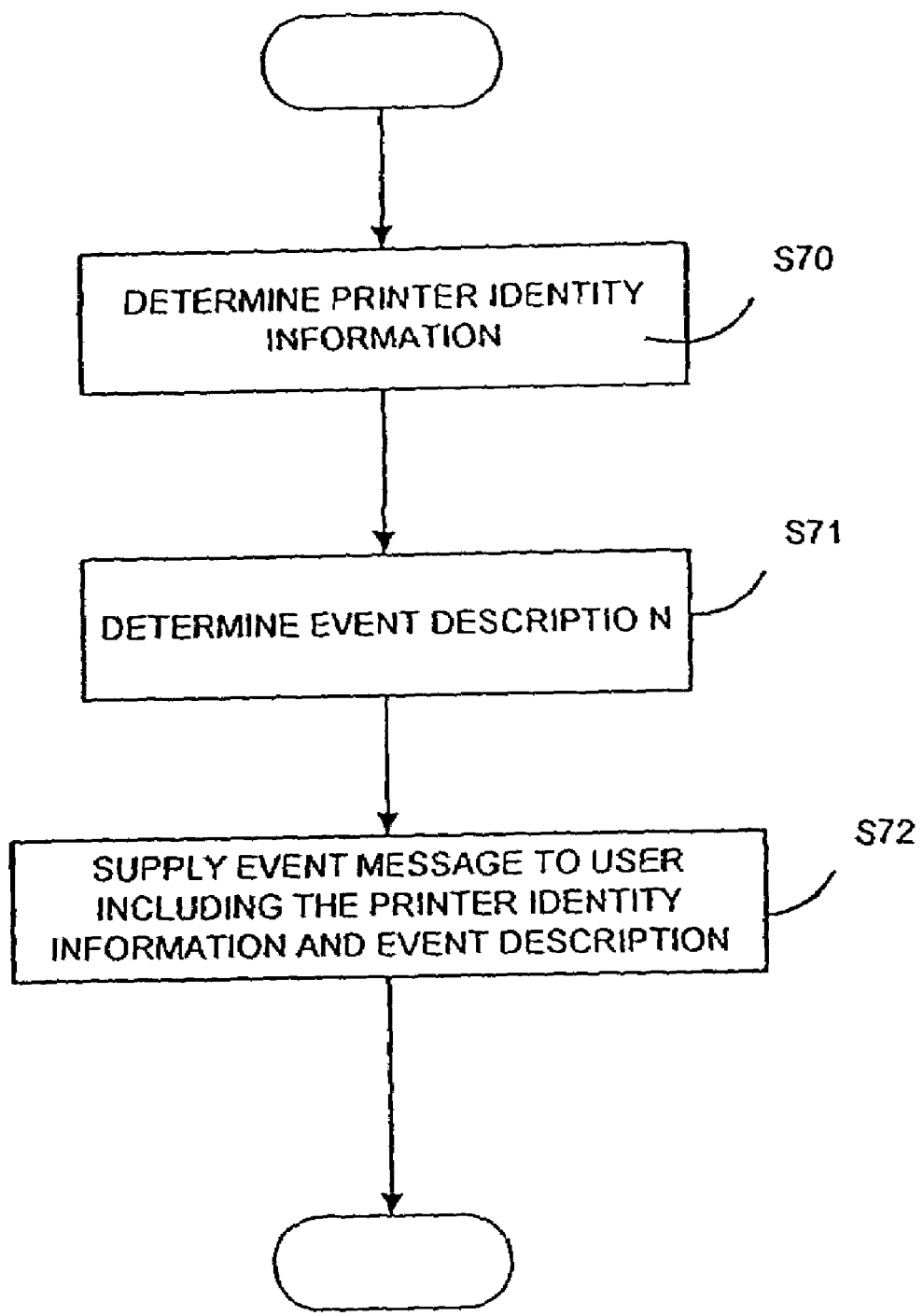
FIG. 14 shows a flow chart for illustrating steps that may be carried out during the handling of an event to enable a user to be provided with details relating to the event.

FIG. 14 shows a flow chart illustrating in greater detail step S63 of FIG. 13 where the event is provided as an event object, for example, a JAVA event object having the form:

```
public class paperjammed {
    public String printer;
    public String des;
}
``` for the case where the event is a printer jam event. Thus, when an event is detected by the event listener 38 the event handler carries out steps S60 to S62 in FIG. 13 as described above. However, at step S63, instead of simply reporting a printer jam, the event handler determines from the JAVA event object information in identifying the printer at step S70, then at step S71 determines from the JAVA event object information describing the event and at step S72 provides the user with a message including the printer information and the event description information.

This is achieved within a VoiceXML document by modifying the event prompt supplied to the user as set out below.
<vxml version=1.0">
<catch event="error.com.xyz.printer.paperjammed">
<prompt>
Printer <value expr_"error.com.xyz.printer.paperjammed.printer"/>
suffered paper jam <value expr_"error.com.xyz.printer.paperjammed.des"/>
</prompt>
</catch>
.
.
.
.
.
.

The remainder of the VoiceXML document is as described above. When this prompt is executed by the dialog interpreter 34, the string identifying the printer in the JAVA event object will be inserted as the value for the expression "error.com.xyz.printer.paperjam.printer" while the string representing the description of the error will be inserted as the value of the expression "error.com.xyz.printer.paperjam.des" so that the prompt supplied to the user will read: "printer x suffered paper jam" followed by a description of the paper jam event which will depend upon the information provided in the JAVA event object. The event description may, for example, specify that the paper jam occurred during printing of document x at the time y. This enables a user to be provided with precise details about the event that has occurred enabling, for example, the user to identify the particular printer used so that, for example, the user can select a different printer, where available, to print the document or, if another printer is not available, to wait until the printer is operational.

In the above described embodiments, the lock and interrupt elements are incorporated within the catch element portion of a VoiceXML document. However, as will be appreciated by those skilled in the art, the lock and interrupt elements could be incorporated into the individual form items so that each individual form item specifies the events for which it can be interrupted. For example, in the case of the task "fax" described in the example set out above then the field item would indicate that this was not to be interrupted (that it is locked) for paper jam events.

Placing the elements identifying whether or not a particular event can interrupt a particular task within the catch element of the documents enables an applications developer to ensure that all catch events and the appropriate interrupt permissions are correctly specified without having to review the entirety of the document. However, where the document is particularly complex, that is it is long or involves a number of nested field items, then it may be more easily readable if the interrupt permission status is specified within the field item.

As another possibility, the form may be divided as set out in the VoiceXML specification and interrupt status specified for each division. As a further possibility, the form may be separated into blocks by inserting block elements and each particular block may be associated with a particular interrupt status.

In the above described embodiments, the interrupt status specifies either that a task may be interrupted by a specific event or may not be interrupted by a specific event. The default may be that interruption is allowed so that if the interrupt and lock elements are omitted for a particular event, then the event will be allowed to interrupt that task. Where this is the case, then it may not be necessary to include both the interrupt and the lock element but simply to provide the lock element. This is however less flexible because the interrupt status of a child item would be set by the interrupt status of the form item. Providing both the "interrupt" and "lock" element enables independent setting of the interrupt status for child and parent items.

The interrupt status elements may also include a further element, a priority element, that specifies the event as either an essential or a non-essential event and the dialog manager configured so as to give any essential events priority so that action is taken in respect of those essential events before any other events occurring at the same time. This would enable, for example, the dialog control device 1 to be advised immediately if a user breaks the connection or terminates the session so that the dialog manager 30 need not handle any other events which are related to the user's session apart from the fact that the user has hung up.

In the above described embodiments, the catchthreads are initialised within the form interpretation algorithm. As another possibility, each catchthread may call the form interpretation algorithm recursively.

It will, of course, be appreciated that it is the function of the interrupt elements that is important and that different identifying names (that is names other than "interrupt", "lock" and "priority") may be used.

In the above mentioned embodiments whether or not a particular task can be interrupted by a particular event or events can be controlled. As another possibility, the interrupt status may indicate that a particular event or events may or may not interrupt any and all tasks or that a particular task may or may not be interrupted by any and all events.

In the above described embodiments, the user interface 36 forms part of the dialog control device. This need not necessarily be the case and, for example, the user interface 36 may be provided by a separate personal computer having a configuration similar to that shown in FIG. 2 which communicates with the dialog control device 1 either directly via a radio or telecommunications link or via the network N. Where the connection between the dialog control device and the users device allows transmission of audio files, then the speech synthesiser 37 may be located at the dialog control device 1. Otherwise, the speech synthesiser 37 may be located at the user's device so that text files provided by the dialog control device are converted to speech by the speech synthesiser of the user's device. As another possibility, the user's device may be a WAP telephone.

In the above described embodiments, the automatic speech recognition engine 32 and grammar files 33 are provided at the dialog control device 1. This need not necessarily be the case and, for example, the dialog control device 1 may be configured to access an automatic speech recognition engine 32 and grammar files 33 over the network N.

In the above described embodiments, the dialog control device 1 is coupled to the devices D1 to DN under its control by a network N. This need not necessarily be the case, and, for example, the system 100 shown in FIG. 1 may constitute a stand alone computer system where the dialog control device 1 comprises for example, a personal computer connected directly via physical or wireless links to devices D1 to DN such as a printer, modem etc. The present invention may also be applied where these components are integrated within a single device.

The present invention is particularly advantageous where the dialog between the dialog control device and the user is an oral or spoken dialog because this is necessarily a time sequential or linear series of actions and interruption of an oral or dialog by an event relating to an earlier task would interrupt and confuse the dialog in relation to the current task. The present invention may, however, also be useful where the dialog is only partly oral, for example, where the dialog control device may respond to the user with text messages displayed on a display screen of relatively small size as in the case of a palm top computer or a WAP telephone. The present invention may also be advantageous where the dialog is a fully visual or text based dialog where the display real estate available on the user's display device is limited or uncontrolled interruption of a user's task by events relating to earlier tasks would be very disruptive to the user. The term "dialog" should therefore be understood to include the communication between a processor and a user where a text and/or graphics based browser rather than a voice browser is being used.

The above described embodiments are implemented using VoiceXML. It may also be possible to apply the present invention using other voice based markup languages such as VOXML. Of course, where the dialog is a nonverbal dialog, then a non-voice markup language such as XML or HTML may be used.

Although the present invention could be implemented using a scripting language such as JAVAScript, the use of a markup language (rather than a scripting language) is particularly appropriate for conducting dialogs with the user because the dialog is concerned with presentation (be it oral or visual) of information to the user. In such circumstances, adding markup to the data is much easier than writing a program to the process data because, for example, it is not necessary for the applications developer to think about how records are to be configured, read and stored or how individual fields are to be addressed. Rather everything is placed directly before them and the markup can be inserted into the data exactly where required. Also, markup languages are very easy to learn and can be applied almost instantously and marked up documents are easy to understood and modified.

The invention claimed is:

1. A control apparatus for controlling communication between a user and at least one processor controlled device capable of carrying out at least one task, the control apparatus comprising:

dialog conducting means for conducting a dialog with the user to determine the task that the user wishes the device to carry out;

device instructing means for instructing the device to carry out the determined task;

event receiving means for receiving event information related to events that occur in relation to the device;

task determining means for determining whether the user is involved with another task when the event receiving means receives event information;

interrupt determining means for identifying interrupt status information associated with at least one of the events for which event information is received and said another task;

interrupt control means for determining whether or not the user can be interrupted on the basis of the identified interrupt status information; and informing means for interrupting the dialog and advising the user of the received event information if the interrupt control means determines that the dialog with the user can be interrupted, and for advising the user of the received event information after finishing the dialog if the interrupt control means determines that the dialog with the user cannot be interrupted.

2. The control apparatus according to claim 1, wherein the dialog conducting means comprises means for conducting an oral dialog with the user.

3. The control apparatus according to claim 1, wherein the dialog conducting means comprises a dialog file store storing dialog files and a dialog interpreter, the dialog files comprising documents incorporating markup language including task elements relating to tasks that can be instructed by the user, prompt elements relating to prompts to be presented to a user, and action elements relating to actions to be taken in response to receipt of information from the user, and wherein the dialog interpreter is arranged to conduct a dialog with the user using the dialog files.

4. The control apparatus according to claim 3, wherein the dialog files include event elements for events for which event information is receivable by the event receiving means.

5. The control apparatus according to claim 3, wherein the dialog files include, for at least one defined task, an interrupt element providing interrupt status information for that task for a particular event.

6. The control apparatus according to claim 3, wherein the dialog files include event elements for each event for which event information is receivable by the event receiving means, and each event element includes at least one interrupt element providing interrupt status information for identifying whether or not the user can be interrupted by that event when the user is involved in another task.

7. The control apparatus according to claim 3, wherein at least one task element includes an interrupt element providing interrupt status information for identifying whether or not a user can be interrupted in response to an event when the user is involved in said at least one task.

8. The control apparatus according to claim 5, wherein the interrupt element comprises a lock element for identifying a task or tasks that cannot be interrupted.

9. The control apparatus according to claim 5, wherein the interrupt element comprises an interrupt element for identifying a task or tasks that can be interrupted.

10. The control apparatus according to claim 5, wherein the interrupt element comprises a priority element for identifying an event for which a dialog with a user should be interrupted or terminated without regard for any involvement of the user in another task.

11. The control apparatus according to claim 3, wherein the dialog files comprise VoiceXML files.

12. The control apparatus according to claim 1, wherein the interrupt control means is arranged to determine that a user involved in a task can be interrupted by an event if no interrupt status information is associated with that task.

13. The control apparatus according to claim 1, further comprising information extracting means for extracting details of an event from the event information received by the event receiving means, wherein the informing means is arranged to provide the user with the extracted event details.

14. The control apparatus according to claim 1, wherein the interrupt control means is arranged to identify essential events from among the events and to interrupt or terminate a dialog with a user in response to receipt of an essential event regardless of whether the user is involved in another task.

15. The control apparatus according to claim 1, wherein the task determining means is arranged to determine that a user is involved in a task when a dialog relating to that task is being conducted with the user.

16. The control apparatus according to claim 1, wherein the interrupt control means is affanged to determine whether or not a user can be interrupted on the basis of identified interrupt status information related to a specific received event.

17. A system comprising:
the control apparatus according to claim 1; and
a plurality of processor-controlled devices adapted to perform tasks in response to device implementable instructions received from the control apparatus and to provide the control apparatus with event information related to the carrying out of a task.

18. The system according to claim 17, wherein the plurality of processor-controlled devices include one or more of a printer, a photocopier, and a facsimile machine.

19. A method of controlling communication between a user and at least one processor-controlled device capable of carrying out at least one task, the method comprising the steps of:
conducting a dialog with the user to determine the task that the user wishes the device to carry out;
instructing the device to carry out the determined task;
receiving event information related to events that occur in relation to the device;
determining whether the user is involved with another task when the event receiving step receives the events information of the events;
identifying interrupt status information associated with at least one of the event and said another task;
determining whether or not the user can be interrupted on the basis of the identified interrupt status information; and
interrupting the dialog with the user, and advising the user of the received event information if it is determined that the dialog with the user can be interrupted, and advising the user of the received event information after finishing the dialog if it is determined that the dialog with the user cannot be interrupted.

20. The method according to claim 19, wherein the dialog conducting step comprises conducting an oral dialog with the user.

21. The method according to claim 19, wherein the dialog conducting step comprises conducting the dialog using dialog files and a dialog interpreter, the dialog files comprising documents incorporating markup language including task elements relating to tasks that can be instructed by the user, prompt elements relating to prompts to be presented to a user, and action elements relating to actions to be taken in response to receipt of information from the user.

22. The method according to claim 21, wherein the dialog files include event elements for events for which event information is receivable by the event receiving step.

23. The method according to claim 21, wherein the dialog files include, for at least one defined task, an interrupt element providing interrupt status information for that task for a particular event.

24. The method according to claim 21, wherein the dialog files include event elements for each event for which event information is receivable by the event receiving step, and each event element includes at least one interrupt element providing interrupt status information for identifying whether or not the user can be interrupted by that event when the user is involved in another task.

25. The method according to claim 21, wherein at least one task element includes an interrupt element providing interrupt status information for identifying whether or not a user can be interrupted in response to an event when the user is involved in said at least one task.

26. The method according to claim 23, wherein the interrupt element comprises a lock element for identifying a task or tasks that cannot be interrupted.

27. The method according to claim 23, wherein the interrupt element comprises an interrupt element for identifying a task or tasks that can be interrupted.

28. The method according to claim 23, wherein the interrupt element comprises a priority element for identifying an event for which a dialog with a user should be interrupted or terminated without regard for any involvement of the user in another task.

29. The method according to claim 21, wherein the dialog files comprise VoiceXML files.

30. The method according to claim 19, wherein the steps of determining whether a user can be interrupted determines that the user can be interrupted by an event if no interrupt status information is associated with that task.

31. The method according to claim 19, further comprising the steps of extracting details of an event from the received event information and providing the user with the extracted event details.

32. The method according to claim 19, wherein the interrupt control step identifies essential events from among the events, and a dialog with the user is interrupted or terminated in response to receipt of event information an essential event regardless of whether the user is involved in another task.

33. The method according to claim 19, wherein the task determining step determines that a user is involved in a task when a dialog relating to that task is being conducted with the user.

34. The method according to claim 19, wherein the interrupt control step determines whether or not a user can be interrupted on the basis of identified interrupt status information related to the specific received event for which event information is received.

35. A computer readable storage medium on which is stored computer executable code for executing a method of controlling communication between a user and at least one processor-controlled device capable of carrying out at least one task, the method comprising the steps of:
conducting a dialog with the user to determine the task that the user wishes the device to carry out;
instructing the device to carry out the determined task;
receiving event information related to events that occur in relation to the device;

determining whether the user is involved with another task when the event receiving step receives the events information of the events;

identifying interrupt status information associated with at least one of the event and said another task;

determining whether or not the user can be interrupted on the basis of the identified interrupt status information; and interrupting the dialog with the user, and advising the user of the received event information if it is determined that the dialog with the user can be interrupted, and advising the user of the received event information after finishing the dialog if it is determined that the dialog with the user cannot be interrupted.

* * * * *

UNITED STATES PATENT AND TRADEMARK OFFICE
CERTIFICATE OF CORRECTION

PATENT NO. : 7,240,009 B2
APPLICATION NO. : 10/398230
DATED : July 3, 2007
INVENTOR(S) : Jost et al.

It is certified that error appears in the above-identified patent and that said Letters Patent is hereby corrected as shown below:

COVER SHEET:
(56) OTHER PUBLICATIONS, "Lucas, Bruce, VoiceXML for Web-Based Distributed Conversational Application," should read -- Lucas, Bruce, VoiceXML for Web-Based Distributed Conversational Applications, --.

(57) ABSTRACT, "A Control" should read -- A control --.

COLUMN 13:
Line 51, "easy to" should read -- easily --.

COLUMN 14:
Line 26, "is affanged" should read -- is arranged --.

COLUMN 15:
Line 28, "include" should read -- includes --.

COLUMN 16:
Line 35, "determines" should read -- determine --; and
Line 45, "information" should read -- information of --.

Signed and Sealed this

First Day of July, 2008

JON W. DUDAS
*Director of the United States Patent and Trademark Office*